US011979505B2

(12) United States Patent
Xu et al.

(10) Patent No.: US 11,979,505 B2
(45) Date of Patent: May 7, 2024

(54) FILE ACQUISITION METHOD AND DEVICE BASED ON TWO-DIMENSIONAL CODE AND TWO-DIMENSIONAL CODE GENERATING METHOD

(71) Applicant: UNI2K Information Technology Co., Ltd., Tongxiang (CN)

(72) Inventors: Xiaoxue Xu, Tongxiang (CN); Zhehai Zhu, Tongxiang (CN); Shaolei Liu, Tongxiang (CN); Yi Shen, Tongxiang (CN); Nianqing Luo, Tongxiang (CN)

(73) Assignee: UNI2K Information Technology Co., Ltd., Tongxiang (CN)

( * ) Notice: Subject to any disclaimer, the term of this patent is extended or adjusted under 35 U.S.C. 154(b) by 377 days.

(21) Appl. No.: 17/422,934

(22) PCT Filed: Mar. 9, 2020

(86) PCT No.: PCT/CN2020/078469
§ 371 (c)(1),
(2) Date: Jul. 14, 2021

(87) PCT Pub. No.: WO2021/051757
PCT Pub. Date: Mar. 25, 2021

(65) Prior Publication Data
US 2022/0070005 A1 Mar. 3, 2022

(30) Foreign Application Priority Data
Sep. 18, 2019 (CN) .......................... 201910881097.4

(51) Int. Cl.
*H04L 9/32* (2006.01)
*H04L 67/06* (2022.01)

(52) U.S. Cl.
CPC .......... *H04L 9/3247* (2013.01); *H04L 9/3236* (2013.01); *H04L 9/3263* (2013.01); *H04L 67/06* (2013.01)

(58) Field of Classification Search
CPC ... H04L 9/3247; H04L 9/3236; H04L 9/3263; H04L 67/06; H04L 63/0428;
(Continued)

(56) References Cited

U.S. PATENT DOCUMENTS

2009/0106550 A1* 4/2009 Mohamed ........... H04L 63/0823
713/156
2012/0259635 A1* 10/2012 Ekchian ................. G06Q 50/18
709/224
(Continued)

OTHER PUBLICATIONS

Dey et al., "Confidential Encrypted Data Hiding and Retrieval Using QR Authentication System", Apr. 2013, International Conference on Communication Systems and Network Technologies, pp. 512-517 (Year: 2013).*

*Primary Examiner* — Kenneth W Chang
(74) *Attorney, Agent, or Firm* — IPro, PLLC

(57) ABSTRACT

The present invention relates to the field of data identification, and in particular to two-dimensional code technology. Provided in the present invention is a two-dimensional code-based file acquisition method, comprising: step 1, parsing a two-dimensional code to acquire two-dimensional code encoded data, wherein the encoded data comprises a first unique value, encrypted data, and signature data; step 2, verifying the signature data; step 3, decrypting the encrypted data to acquire a file address and an. nth data segment In; step 4, acquiring an. encrypted file according to the nth data segment $I_n$ and the file address; step 5, verifying the encrypted file according to the first unique value to acquire a decrypted file. The present invention solves the technical problems of easy tampering and poor security when data is
(Continued)

stored and acquired on the basis of a two-dimensional code, and implements secure and reliable information protection.

12 Claims, 2 Drawing Sheets

(58) Field of Classification Search
CPC ............... H04L 63/123; H04L 63/0823; H04L 63/0442; H04L 63/08; G09C 5/00; G06K 19/06046
See application file for complete search history.

(56) References Cited

U.S. PATENT DOCUMENTS

| | | | | |
|---|---|---|---|---|
| 2013/0019096 A1* | 1/2013 | Palzer | ................... | H04W 12/06 713/168 |
| 2014/0019755 A1* | 1/2014 | Gerstner | ................ | H04L 67/06 713/165 |
| 2015/0006895 A1* | 1/2015 | Irvine | ................. | G06F 21/6209 713/171 |
| 2015/0358163 A1* | 12/2015 | Carter | ................... | G06F 21/645 713/179 |
| 2016/0267433 A1* | 9/2016 | Liu | ........................ | G06Q 10/10 |
| 2017/0243204 A1* | 8/2017 | Murphy | ................. | H04L 51/08 |

* cited by examiner

FILE ACQUISITION METHOD AND DEVICE BASED ON TWO-DIMENSIONAL CODE AND TWO-DIMENSIONAL CODE GENERATING METHOD

TECHNICAL FIELD

The present invention relates to the field of software methods, and in particular to a two-dimensional code technology.

BACKGROUND

Generally, the prior art meets corresponding needs in the form of network requests for the use of a two-dimensional code, and the data contents are stored in a terminal. Although the prior art can achieve many functions, the security of the information is unreliable.

Firstly, because most of the two-dimensional code generating and analyzing technologies in the prior art are disclosed technologies, it is easy to tamper the data in a two-dimensional code and change the URL network address. This is one of the weakness in the prior art, which can be used by lawless persons to allow users to download the contents through the address tampered by the lawless persons to achieve an illegal purpose.

Secondly, the prior art has no good security protection for the downloaded contents. Generally, the downloaded contents will be displayed. Thus, a series of problems will be caused. First, the users cannot obtain required contents; and second, the users may obtain some contents which carry a Trojan horse. From the perspective of a service provider, the service provider may cause data disorder when a terminal server is maintained, so that the users obtain some information of other users, resulting in irreparable consequences.

Therefore, according to the prior art, a set of secure information protection process is designed, so that no error occurs in the process of information circulation in the network, to prevent information tampering and ensure information security.

SUMMARY

To solve the technical problems of easy tampering and poor security when data is stored and acquired based on the two-dimensional code in the prior art and realize safe and reliable information protection, the present invention proposes a file acquisition method based on a two-dimensional code, comprising:

step 1: analyzing the two-dimensional code to obtain two-dimensional code encoding data, and the encoding data comprising a first unique value, encrypted data and signature data;

step 2: verifying the signature data;

step 3: if verification of the signature data is passed, decrypting the encrypted data to obtain an encrypted file address and an nth data segment $I_n$; analyzing the nth data segment $I_n$ to obtain an nth part $A_n$ of the encrypted file and a storage address $S_{n-1}$ of an (n−1)th data segment $I_{n-1}$ located on a server, wherein n is the number of data segments obtained after file splitting;

step 4: acquiring the (n−i)th data segment $I_{n-i}$ of the encrypted file according to the storage address $S_{n-i}$ of the (n−i)th data segment and analyzing the (n−i)th data segment $I_{n-i}$ to obtain the (n−i)th part $A_{n-i}$ of the encrypted file and the storage address $S_{n-(i+1)}$ of the n−(i+1)th data segment $I_{n-(i+1)}$, i=1, 2, 3, . . . , n−2;

acquiring the first data segment of the encrypted file according to the storage address $S_1$ of the first data segment $I_1$, and analyzing the first data segment to obtain the first part $A_1$ of the encrypted file; integrating the first part $A_1$ to the nth part $A_n$ of the encrypted file to obtain the encrypted file;

step 5: verifying the encrypted file according to the first unique value to obtain a decrypted file.

Preferably, the step 5 comprises:

step 5.1: calculating the unique value of the encrypted file to obtain a second unique value of the encrypted file;

step 5.2: comparing the second unique value with the first unique value; if the second unique value is equal to the first unique value, decrypting the encrypted file; and if the second unique value is not equal to the first unique value, stopping a file decryption process.

Preferably, the step 2 comprises:

verifying the signature data by using a digital certificate; if the digital certificate verifies that the signature is correct, executing step 3; and if verification fails, stopping executing the file acquisition method based on the two-dimensional code.

Preferably, the nth data segment is formed by splicing a header character $x_n$ and the nth part $A_n$ of the encrypted file; the $x_n$ comprises a displacement T; the analysis of the nth data segment is mapping of the head character $x_n$ to obtain an (n−1)th storage address $S_{n-1}$; the header character $x_n$ corresponds to a server storage address one by one; or the storage address is calculated by using a functional relationship between a preset server storage address and the displacement T.

A two-dimensional code generating method, comprises:

step 1: making calculation for the encrypted file to obtain a first unique value;

step 2: splitting the encrypted file to obtain the first part $A_1$, the second part $A_2$ to the nth part $A_n$ of the encrypted file; storing the first part $A_1$, the second part $A_2$ to the (n−1)th part $A_{n-1}$ of the encrypted file into n−1 storage addresses $S_1$, $S_2$ to $S_{n-1}$ on a server; and obtaining an encrypted file address;

step 3: conducting encryption for the nth data segment $I_n$ and the encrypted file address to obtain encrypted data, and analyzing the nth data segment $I_n$ to obtain the storage address $S_{n-1}$ of the (n−1)th data segment on the server and the data segment of part $A_n$ of the encrypted file;

step 4: signing for the first unique value and the encrypted data to obtain signature data;

step 5: encoding the first unique value, the encrypted data and the signature data to form a two-dimensional code.

Preferably, the step 3 of making calculation for the file comprises: acquiring a data information algorithm or cryptographic hash function algorithm irreversibly.

Preferably, the step 4 comprises signing for the first unique value and the encrypted data by using a digital certificate.

Preferably, the nth data segment is formed by splicing a header character $x_n$ and the nth part $A_n$ of the encrypted file; the $x_n$ comprises a displacement T; the analysis of the nth data segment is mapping of the head character $x_n$ to obtain an (n−1)th storage address $S_{n-1}$; the header character $x_n$ corresponds to a server storage address one by one; or the storage address is calculated by using a functional relationship between a preset server storage address and the displacement T.

A file acquisition device based on a two-dimensional code, comprises:

a scanning and analyzing unit for acquiring and analyzing the two-dimensional code to obtain encoding data;

a data processing unit for obtaining encrypted data, a first unique value and signature data according to the encoding data;

a data decrypting unit for verifying the signature data;

if verification of the signature data is passed, decrypting the encrypted data to obtain an encrypted file address and an nth data segment $I_n$; analyzing the nth data segment $I_n$ to obtain an nth part $A_n$ of the encrypted file and a storage address $S_{n-1}$ of an (n−1)th data segment $I_{n-1}$ located on a server, wherein n is the number of data segments obtained after file splitting; acquiring the (n−i)th data segment $I_{n-i}$ of the encrypted file according to the storage address $S_{n-i}$ of the (n−i)th data segment $I_{n-i}$, and analyzing the (n−i)th data segment $I_{n-i}$ to obtain the (n−i)th part $A_{n-i}$ of the encrypted file and the storage address $S_{n-(i+1)}$ of the n−(i+1)th data segment $I_{n-(i+1)}$, i=1, 2, 3, . . . , n−2; acquiring the first data segment of the encrypted file according to the storage address $S_1$ of the first data segment $I_1$, and analyzing the first data segment to obtain the first part $A_1$ of the encrypted file;

a file downloading and combining unit, wherein the file downloading unit is used for downloading the encrypted file according to the encrypted file address, and integrating the first part $A_1$, the second part $A_2$ to the nth part $A_n$ of the encrypted file to obtain the encrypted file;

a file verifying unit for verifying the encrypted file.

Preferably, the file verifying unit comprises:

a unique value calculating subunit for making calculation for the encrypted file to obtain a second unique value;

a comparison subunit for comparing the first unique value with the second unique value, decrypting the encrypted file if the second unique value is equal to the first unique value, and stopping a file decryption process if the second unique value is not equal to the first unique value.

Preferably, the data decrypting unit verifies the signature data by using the digital certificate, executes step 3 if verification is passed, and stops executing the file acquisition method based on the two-dimensional code if verification fails.

Preferably, the nth data segment is formed by splicing a header character $x_n$ and the nth part $A_n$ of the encrypted file; the $x_n$ comprises a displacement T; the analysis of the nth data segment is mapping of the head character $x_n$ to obtain an (n−1)th storage address $S_{n-1}$; the header character $x_n$ corresponds to a server storage address one by one; or the storage address is calculated by using a functional relationship between a preset server storage address and the displacement T.

In the file acquisition method and device based on the two-dimensional code, and the two-dimensional code generating method provided by the present invention, the signature data, the unique values and the website data are encoded and stored into the two-dimensional code; and a data certificate technology and a unique value verification technology are flexibly used to ensure both the safety of download links in the two-dimensional code and the reliability of downloaded documents.

DETAILED DESCRIPTION

The technical solution in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

In view of the technical problems of easy tampering and poor security when data is stored and acquired based on the two-dimensional code in the existing methods, the present invention provides a file acquisition method and device based on a two-dimensional code, and a two-dimensional code generating method.

Embodiment 1

Figure 1:
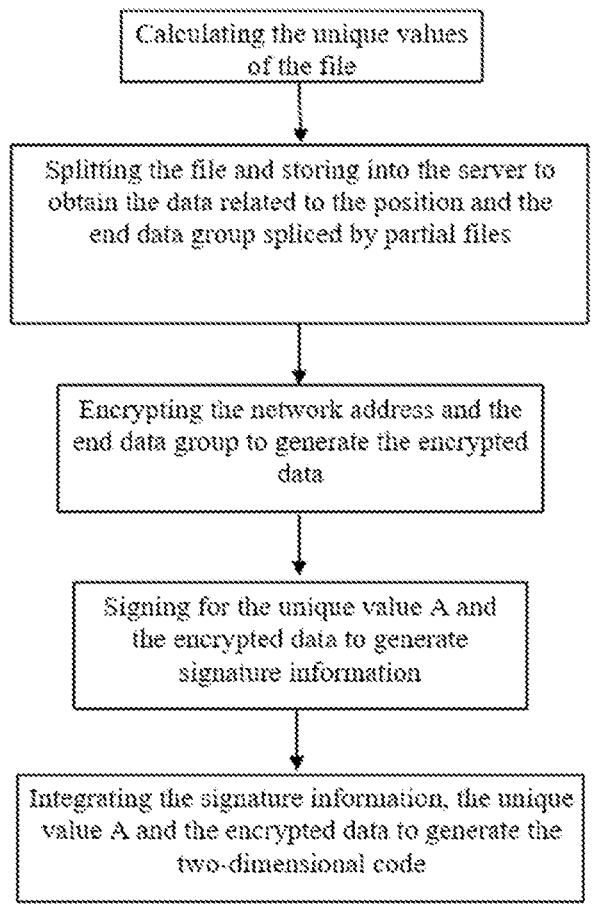
FIG. 1 is a flow chart of a two-dimensional code generating method provided by embodiment 1 of the present invention.

The present embodiment provides a two-dimensional code encoding method, as shown in FIG. 1, comprising the following steps:

1. Calculating a file unique value. The unique value is an irreversible value, i.e., it is possible to inversely calculate the contents of a text through the unique value anyway. This can protect the information of the text from being disclosed. Calculation methods of the unique value comprise cryptographic hash function algorithms of SHA-256 and SM3.

2. Converting a file into a 16-bit data file, splitting the 16-bit data file into n parts to obtain n data segments, and storing the above data segments into n positions in a service area; and randomly selecting a number Y within 10.

A first header file 00000000 and the first data segment are spliced to obtain the first data group which is stored in the first data area; the first data area is calculated according to the functional relationship which is preset in the local or two-dimensional code to obtain position $x_1$; the position parameter $x_1$ and Y are treated by the functional relationship to obtain a second header file; then the second header file is integrated with the second data segment and stored in the second data area; the first data area is calculated according to the functional relationship which is preset in the local or two-dimensional code to obtain position $x_2$; the third data segment of the file is stored into the third data area, and so on. A data table is saved when the length of the nth data segment is less than 32 bits. The nth header file related to $x_{n-1}$ and the remaining number of the end data segments are written into the last data group of the two-dimensional code.

A network address or a mapping address of the network address is obtained.

The above process of storing the text can be uploaded by the user or completed by the agent of the service provider. The type of the text can be binary information files of images, words, videos and audio.

3. Encrypting the network address and the end data group by a private key of the digital certificate to generate encrypted data.

The above digital certificate may be a CA with a national digital certificate license or a digital certificate produced by the service provider. The encryption process must be the private key of the certificate. This can ensure that a decryption device contains only a public key of the certificate and does not need to expose the private key.

4. Signing for the unique value A and the encrypted data by using the digital certificate to generate signature information.

5. Integrating the signature information, the unique value A and the encrypted data to generate the two-dimensional code.

The present invention adds information security protection measures at the download address data level of the two-dimensional code and the document data level, which can effectively prevent the information from being tampered and prevent the document from being swapped and modified. The present invention adopts split storage which is a storage mode in which the storage address is calculated in a progressive way through preset mapping, which can save storage space, effectively protect the information of the text and prevent the file from being tampered.

Embodiment 2

Figure 2:
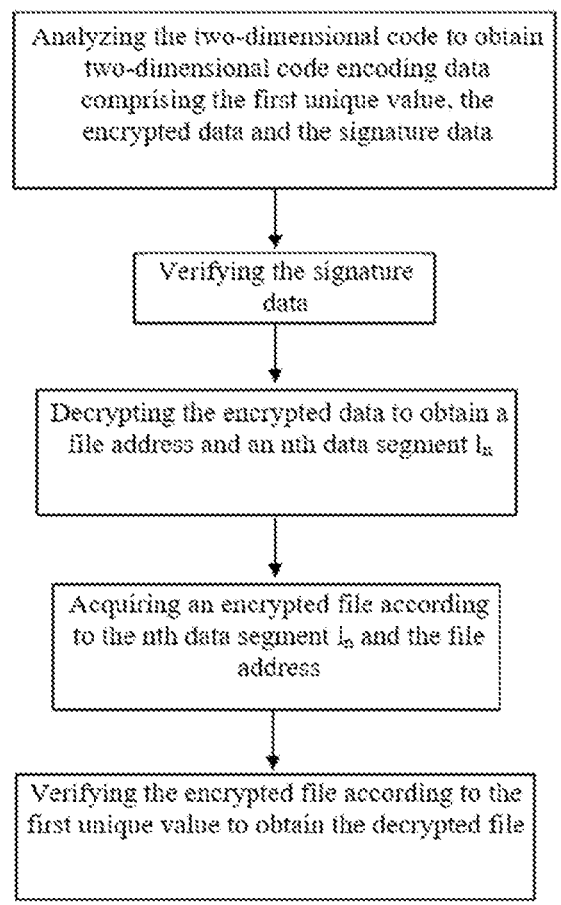
FIG. 2 is a flow chart of a file acquisition method based on a two-dimensional code provided by embodiment 2 of the present invention.

The present embodiment provides a two-dimensional code generating method and device, as shown in FIG. 2.

Decoding and a digital certificate included in the decoding device comprise:

1. A scanning and analyzing module: which is used for capturing the image of the two-dimensional code and trying to analyze the image to obtain the data in the two-dimensional code.

2. A data processing module: which is used for separating the data in the two-dimensional code to obtain the encrypted data, the unique value A and the signature information.

3. A data verification module: which is used for verifying the authenticity of the information obtained in the two-dimensional code by using the digital certificate. If the verification of the digital certificate is successful, it indicates that the encrypted data and the unique value A are valid information and have not been tampered. If the verification of the digital certificate fails, it indicates that the data in the two-dimensional code may be at risk of being tampered and next operation will not be carried out.

A data decoding module: the digital certificate is used to decode the data according to the encryption address. After the decoding is successful, a network request address URL and the end data group in which the two-dimensional code is written are obtained. The end data group is separated to obtain an end data segment and 8-bit data located in the head of the end data group. The above 8-bit data is processed according to a preset function or a corresponding table to obtain a file storage position of a; the data group of the penultimate segment is obtained from the storage position of the penultimate segment; the penultimate data segment is separated to obtain the 8-bit data corresponding to the head of the segment to obtain the storage position of an antepenultimate segment; and this process is circulated until all data segments of the file are obtained.

4. A document download module: the document is downloaded through the URL; and the data segments in all the positions are combined into a file, and the downloaded document is not allowed to be opened immediately, to prevent virus threats.

5. A file verification module: unique value processing is conducted on a plurality of data segments which are downloaded in combination to obtain the unique value B, and the unique values A and B are compared. If the data are consistent, it indicates that the obtained document is the original data stored at that time. If the data are inconsistent after comparison, it indicates that the downloaded document has been tampered and the information is incorrect. Or, the downloaded document may be a virus, has a risk, and is not allowed to be opened to protect the use security of the user.

The analyzing process comprises:

analyzing the two-dimensional code to obtain the encryption address, the unique value A and the signature information in the two-dimensional code;

verifying the data information;

decrypting the encrypted information to obtain a website link;

downloading the document through the website link, and calculating the unique value B of the document;

comparing the unique value A with the unique value B.

If A and B are inconsistent, it indicates that the document has a risk and the operation is stopped. If A and B are consistent, it indicates that the downloaded document is the document uploaded by the user and can be downloaded securely.

The present invention encodes the signature data, the unique values obtained by calculation and the website together into the two-dimensional code, and flexibly uses the digital certificate technologies, including the encryption, decryption and verification technologies of the digital certificate to ensure the security of the information. Through a unique value verification mechanism, by using the principle that the same data after unique value operation generates the same value, the unique values of the same information are compared in different stages, so as to prove whether the information is tampered to ensure that the information is secure and not disclosed.

To sum up, a data carrier acquisition method of a two-dimensional code provided by embodiments of the present invention has the following beneficial effects:

(1) Through the combination of the encryption, decryption and signature methods of the two-dimensional code and the digital certificate, the present invention improves the security of the data and effectively prevents the data from being tampered.

(2) In the encoding and decoding processes of the two-dimensional code of the present invention, the security of the download address data is enhanced by the asymmetric encryption setting which verifies the reliability of the data.

(3) The two-dimensional code information protection method of the present invention can verify the security of text information in the final step, ensure that the downloaded text is the initial uploaded text, and ensure the one-to-one correspondence of information acquisition.

(4) The present invention adopts split storage which is a storage mode in which the storage address is calculated in a progressive way through preset mapping, which can save storage space, effectively protect the information of the text and prevent the file from being tampered.

The purposes, technical solutions and beneficial effects of the present invention are further described in detail through the above specific embodiments. It shall be understood that the above only describes specific embodiments of the present invention and is not intended to limit the protection scope of the present invention. Any modification, equivalent replacement, improvement, etc. made within the spirit and the principle of the present invention shall be included within the protection scope of the present invention.

What is claimed is:

1. A file acquisition method based on a two-dimensional code, wherein, comprising:

step 1: analyzing the two-dimensional code, obtaining two-dimensional code encoding data, and the encoding data comprising a first unique value, encrypted data and signature data;

step 2: verifying the signature data;

step 3: if verification of the signature data is passed, decrypting the encrypted data to obtain an address of an encrypted file and an nth data segment $I_n$; analyzing the nth data segment $I_n$ to obtain an nth part $A_n$ of the encrypted file and a storage address $S_{n-1}$ on a server of an (n−1)th data segment $I_{n-1}$, wherein, n is the number of data segments obtained after file splitting, and n≥4;

step 4: acquiring an (n−i)th data segment $I_{n-i}$ of the encrypted file according to a storage address $S_{n-i}$ of the (n−i)th data segment $I_{n-1}$, and analyzing the (n−i)th data segment $I_{n-i}$ to obtain an (n−i)th part $A_{n-i}$ of the encrypted file and a storage address $S_{n-(i+1)}$ of an n−(i+1)th data segment $I_{n-(i+1)}$, i=1, 2, 3, . . . , n−2; acquiring a first data segment of the encrypted file according to a storage address $S_1$ of a first data segment $I_1$, and analyzing the first data segment to obtain a first part $A_1$ of the encrypted file; integrating the first part $A_1$ to the nth part $A_n$ of the encrypted file to obtain the encrypted file;

step 5: verifying the encrypted file according to the first unique value to obtain a decrypted file.

2. A file acquisition method based on the two-dimensional code according to claim 1,
wherein, the step 5 comprises:
step 5.1: calculating a unique value of the encrypted file to obtain a second unique value of the encrypted file;
step 5.2: comparing the second unique value with the first unique value; if the second unique value is equal to the first unique value, decrypting the encrypted file; and if the second unique value is not equal to the first unique value, stopping a file decryption process.

3. A file acquisition method based on the two-dimensional code according to claim 1,
wherein, the step 2 comprises:
verifying the signature data by using a digital certificate, if the digital certificate verifies that a signature is correct, executing step 3; and if verification fails, stopping executing the file acquisition method based on the two-dimensional code.

4. A file acquisition method based on the two-dimensional code according to claim 1,
wherein, the nth data segment is formed by splicing a header character $x_n$ and the nth part $A_n$ of the encrypted file; the header character $x_n$ comprises a displacement T; the analyzing the nth data segment $I_n$ is mapping of the header character $x_n$ to obtain an (n−1)th storage address $S_{n-1}$; the header character $x_n$ corresponds to the (n−1)th storage address $S_{n-1}$ one by one; or the (n−1)th storage address $S_{n-1}$ is calculated by using a preset functional relationship between the (n−1)th storage address $S_{n-1}$ and the displacement T.

5. A two-dimensional code generating method, wherein, comprising:
step 1: making calculation for an encrypted file to obtain a first unique value;
step 2: splitting the encrypted file to obtain a first part $A_1$, a second part $A_2$ to an nth part $A_n$ of the encrypted file; storing the first part $A_1$, the second part $A_2$ to an (n−1)th part $A_{n-1}$ of the encrypted file into n−1 storage addresses $S_1$, $S_2$ to $S_{n-1}$ on a server; and obtaining an encrypted file address, wherein n≥4;

step 3: conducting encryption for an nth data segment $I_n$ and the encrypted file address to obtain encrypted data; and the storage address $S_{n-1}$ on the server of an (n−1)th data segment and the nth part $A_n$ of the encrypted file are obtained after an analysis of the nth data segment $I_n$;

step 4: signing for the first unique value and the encrypted data to obtain signature data;

step 5: encoding the first unique value, the encrypted data and the signature data to form a two-dimensional code.

6. A two-dimensional code generating method according to claim 5, wherein, the making calculation for an encrypted file in step 1 comprises: acquiring a data information algorithm or cryptographic hash function algorithm irreversibly.

7. A two-dimensional code generating method according to claim 5, wherein, the step 4 comprises signing for the first unique value and the encrypted data by using a digital certificate.

8. A two-dimensional code generating method according to claim 5, wherein, the nth data segment $I_n$ is formed by splicing a header character $x_n$ and the nth part $A_n$ of the encrypted file; the $x_n$ comprises a displacement T; the analysis of the nth data segment $I_n$ is mapping of the header character $x_n$ to obtain the (n−1)th storage address $S_{n1}$; the header character $x_n$ corresponds to the (n−1)th storage address $S_{n-1}$ one by one; or the (n−1)th storage address $S_{n-1}$ is calculated by using a preset functional relationship between the (n−1)th storage address $S_{n-1}$ and the displacement T.

9. A file acquisition device based on a two-dimensional code, comprising a processor and a memory having executable instructions stored thereon that when executed by the processor cause the processor to execute a file acquisition method based on a two-dimensional code, wherein the file acquisition method comprises:
step 1: scanning and analyzing for acquiring and analyzing the two-dimensional code to obtain encoding data;
step 2: data processing for obtaining encrypted data, a first unique value and signature data according to the encoding data;
step 3: data decrypting for verifying the signature data;
step 4: if verification of the signature data is passed, decrypting the encrypted data to obtain an address of an encrypted file address and an nth data segment $I_n$; analyzing the nth data segment $I_n$ to obtain an nth part $A_n$ of the encrypted file and a storage address $S_{n-1}$ of an (n−1)th data segment $I_{n-1}$ located on a server, wherein n is the number of data segments obtained after file splitting; acquiring an (n−i)th data segment $I_{n-i}$ of the encrypted file according to a storage address $S_{n-i}$ of the (n−i)th data segment $I_{n-1}$, and analyzing the (n−i)th data segment $I_{n-i}$ to obtain an (n−i)th part $A_{n-i}$ of the encrypted file and a storage address $S_{n-(i+1)}$ of an n−(i+1)th data segment $I_{n-(i+1)}$, i=1, 2, 3, . . . , n−2; acquiring a first data segment $I_1$ of the encrypted file according to a storage address $S_1$ of the first data segment and analyzing the first data segment to obtain the first part $A_1$ of the encrypted wherein, n≥4;
step 5: file downloading and combining for downloading the encrypted file according to the encrypted file address, and integrating a first part $A_1$, a second part $A_2$ to an nth part $A_n$ of the encrypted file to obtain the encrypted file;
step 6: file verifying for verifying the encrypted file.

10. A file acquisition device based on the two-dimensional code according to claim 9, wherein,
the step 6 comprises:

a unique value calculating process for making calculation for the encrypted file to obtain a second unique value;

a comparison process for comparing the first unique value with the second unique value, decrypting the encrypted file if the second unique value is equal to the first unique value, and stopping a file decryption process if the second unique value is not equal to the first unique value.

11. A file acquisition device based on the two-dimensional code according to claim 9, wherein, the step 3 comprises performing verification of the signature data by using the digital certificate, and executing the step 4 if the verification passes, and stopping executing the file acquisition method based on the two-dimensional code if the verification fails.

12. A file acquisition device based on the two-dimensional code according to claim 9, wherein, the nth data segment is formed by splicing a header character $x_n$ and the nth part $A_n$ of the encrypted file; the header character $x_n$ comprises a displacement T; and the analysis of the nth data segment is mapping of the header character $x_n$ to obtain an (n−1)th storage address $S_{n-1}$; the header character $x_n$ corresponds to the (n−1)th storage address $S_{n-1}$ one by one; or the (n−1)th storage address $S_{n-1}$ is calculated by using a preset functional relationship between the (n−1)th storage address $S_{n-1}$ and the displacement T.

* * * * *